(12) United States Patent
Govindankutty et al.

(10) Patent No.: US 9,800,620 B2
(45) Date of Patent: Oct. 24, 2017

(54) SOFTPHONE OVER DESKTOP-AS-A-SERVICE (DAAS)

(71) Applicant: VMWARE, INC., Palo Alto, CA (US)

(72) Inventors: Sivaprasad Kundoor Govindankutty, Bangalore (IN); Jubish Kulathumkal Jose, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 14/277,819

(22) Filed: May 15, 2014

(65) Prior Publication Data

US 2015/0288727 A1 Oct. 8, 2015

(30) Foreign Application Priority Data

Apr. 3, 2014 (IN) ............... 1799/CHE/2014

(51) Int. Cl.
*G06F 15/16* (2006.01)
*H04L 29/06* (2006.01)
*G06F 21/00* (2013.01)
*G06F 21/34* (2013.01)
*H04L 29/12* (2006.01)

(52) U.S. Cl.
CPC .......... *H04L 65/1059* (2013.01); *G06F 21/00* (2013.01); *G06F 21/34* (2013.01); *H04L 61/157* (2013.01)

(58) Field of Classification Search
CPC ............. H04L 41/0803; H04L 41/0806; H04L 61/2015; H04L 67/10; H04L 67/34; H04L 41/082; H04L 41/0853; H04L 65/1059; H04L 61/157; G06F 9/44505; G06F 8/60; G06F 21/34; G06F 21/00

USPC ............... 709/203–226; 379/218, 88
See application file for complete search history.

(56) References Cited

U.S. PATENT DOCUMENTS

| | | | |
|---|---|---|---|
| 6,404,877 B1* | 6/2002 | Bolduc | H04M 3/42306 379/115.02 |
| 6,697,858 B1* | 2/2004 | Ezerzer | H04L 41/0893 370/231 |
| 9,148,487 B2* | 9/2015 | Hilburn | H04L 67/303 |
| 2004/0264439 A1* | 12/2004 | Doherty | H04L 29/06027 370/352 |
| 2005/0129003 A1* | 6/2005 | Baeder | H04L 29/06027 370/352 |
| 2005/0177380 A1* | 8/2005 | Pritchard | G06Q 10/063118 705/7.17 |
| 2005/0249193 A1* | 11/2005 | Epley | H04L 29/06027 370/352 |
| 2008/0123628 A1* | 5/2008 | Everard | H04L 65/1083 370/352 |
| 2008/0170689 A1* | 7/2008 | Boubion | H04W 12/04 380/260 |

(Continued)

*Primary Examiner* — David Lazaro
*Assistant Examiner* — Berhanu Shitayewoldetsad

(57) ABSTRACT

Techniques for delivering telephone access are provided. In one embodiment, a server system can determine a telephone number assigned to a user operating a client device. The server system can further retrieve, based on the telephone number, softphone configuration data from a telephony service, where the softphone configuration data enables a softphone associated with the client device to register itself, and the telephone number, with the telephony service. The server system can then transmit the softphone configuration data to the client device.

21 Claims, 10 Drawing Sheets

(56) References Cited

U.S. PATENT DOCUMENTS

2010/0157988 A1* 6/2010 Takeuchi ............ H04L 65/1053
370/352
2014/0334618 A1* 11/2014 Tang .................. H04M 3/5141
379/265.09

* cited by examiner

SOFTPHONE OVER DESKTOP-AS-A-SERVICE (DAAS)

RELATED APPLICATIONS

Benefit is claimed under 35 U.S.C. 119(a)-(d) to Foreign application Serial No. 1799/CHE/2014 filed in India entitled "SOFTPHONE OVER DESKTOP-AS-A-SERVICE (DAAS)", filed on Apr. 3, 2014, by VMware, Inc., which is herein incorporated in its entirety by reference for all purposes.

BACKGROUND

"Desktop-as-a-Service" (DaaS) is a computing paradigm in which a service provider (e.g., a corporate IT department, a third-party provider, etc.) centrally manages and delivers desktop operating system environments (i.e., "desktops") and associated application software to users as a cloud-based service. This allows the users to access their personalized desktops and applications from any number of client devices, and from any location (e.g., home, work, temporary office, etc.). This also allows the service provider to maintain centralized control over the users' desktop data and resources, resulting in increased reliability, security, and operational efficiency.

One limitation of DaaS in general is that, while it enables portability of user desktops and associated applications, it does not enable portability of another key aspect of a user's typical work environment—the user's telephone. This limitation can be problematic in several scenarios. For example, consider a scenario where users A and B are employees of an organization involved in time-critical and/or confidential business (e.g., financial, military, government, medical, legal, etc.). Assume that user A decides to work from home one day and accesses his/her office desktop remotely via DaaS. Further assume that user B attempts to call user A at his/her office telephone number for a critical, confidential query (e.g., a query that can only be communicated verbally) while user A is working from home. In this case, since user A is not available at his/her office telephone number, user B may be forced to call user A at an external telephone number, such as user A's home or cell phone number. This outcome is inefficient because user B may need to expend time and energy attempting to determine user A's external telephone number. This outcome also raises security concerns because the call to user A's external telephone number will likely be routed over a public telephone network (instead of the organization's jute mal telephone network).

To work around the limitation above, some DaaS service providers install a generic softphone client as a native application within each user's desktop. With this approach, a user can launch the softphone client from his/her desktop, login to a telephony service, and thereafter use the softphone client to send and receive phone calls at an assigned telephone number (which can be made known to others in the same group, organization, etc.) through the telephony service. However, this approach suffers from a number of drawbacks. First, since the softphone client is delivered as a native desktop application, the user must request and access his/her desktop before using the softphone client. In other words, there is no way for the user to access the softphone client alone as a separate and independent resource. This leads to inefficiencies on the service provider side, since the DaaS service provider will need to allocate server resources to deliver the user's full desktop to his/her client device, even if the user only wants access to the softphone client for telephony purposes.

Second, since the softphone client is generic to all users (in other words, the DaaS service provider does not dynamically configure the softphone client on a per-user basis), the DaaS service provider generally will not have any visibility into, or control over, the mapping of users to telephony accounts/telephone numbers. As a result, the DaaS service provider cannot explicitly provision telephone numbers to users or monitor telephone usage metrics.

Third, the foregoing approach requires that a user login at least twice in order to use the softphone client: once to login to the DaaS service (via a DaaS client) and again to login to the telephony service (via the softphone client). As a result, the user must keep track of two different access points and two different sets of login credentials, which can be burdensome and potentially error-prone.

SUMMARY

Techniques for delivering telephone access are provided. In one embodiment, a server system can determine a telephone number assigned to a user operating a client device. The server system can further retrieve, based on the telephone number, softphone configuration data from a telephony service, where the softphone configuration data enables a softphone associated with the client device to register itself, and the telephone number, with the telephony service. The server system can then transmit the softphone configuration data to the client device.

The following detailed description and accompanying drawings provide a better understanding of the nature and advantages of particular embodiments.

DETAILED DESCRIPTION

Figure 1:
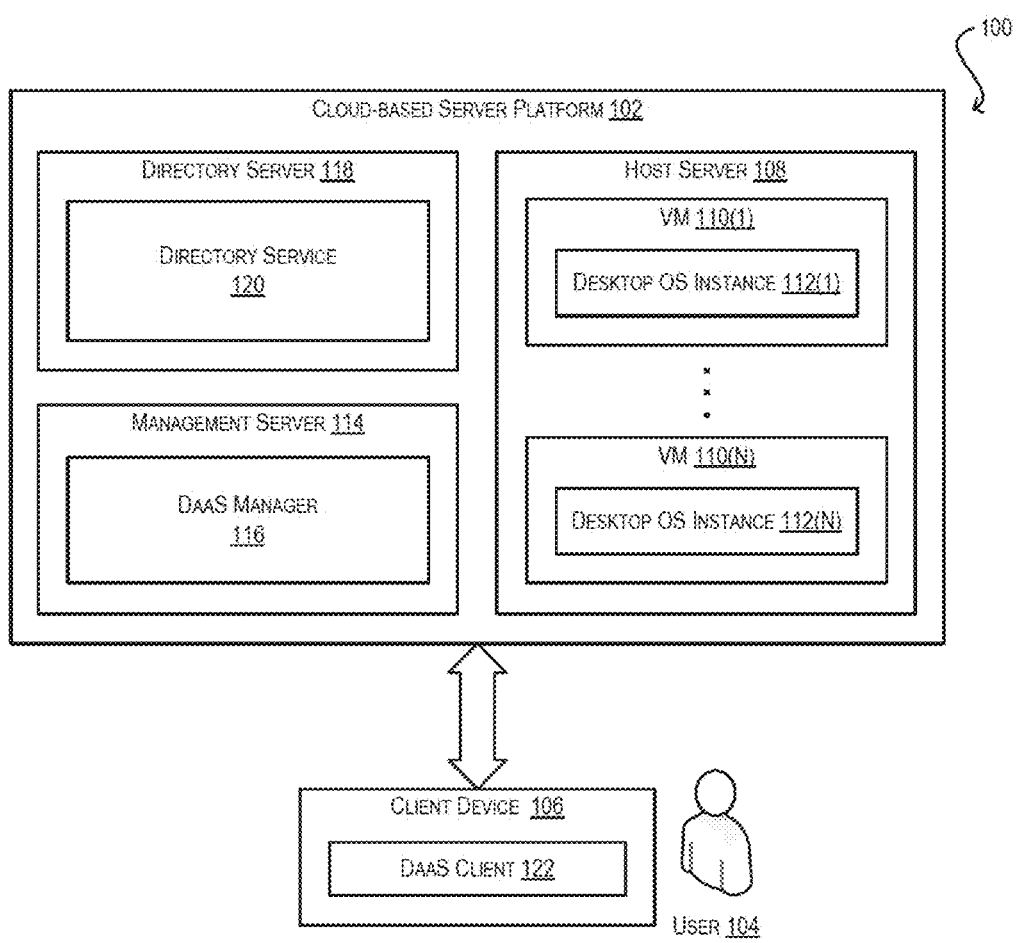
FIG. 1 depicts an exemplary DaaS environment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes a framework, referred to as "Softphone-over-DaaS" (SoDaaS), for delivering telephone access to users of a DaaS service. At a high level, the SoDaaS framework comprises (1) a central management component (referred to as a "SoDaaS manager") that is integrated into, or configured to interoperate with, an existing management component of the DaaS service; and (2) a client-side component (referred to as a "SoDaaS client") that is integrated into, or configured to interoperate with, an existing DaaS client on each user's client device. When a user of the DaaS service requests telephone access via his/her client device, the SoDaaS manager can automatically determine (by, e.g., querying a directory service) a telephone number that has been assigned to the user. For example, the telephone number may be the user's office number or extension. The SoDaaS manager can further retrieve, based on the telephone number, softphone configuration data from a telephony service. The softphone configuration data can include a target address of the telephony service/server, security credentials/metadata username and password, or telephone number and PIN), and/or parameters for setting up/maintaining a telephony session (e.g., protocol, port, etc.). The telephony service can be, e.g., a service that is hosted "on-premise" by the DaaS service provider, or a separate, cloud-based service. The SoDaaS manager can then transmit the softphone configuration data (either as-is or as an encrypted file) to the client device/SoDaaS client.

Upon receiving the softphone configuration data, the SoDaaS client can activate a softphone associated with the client device using the received data. The softphone can be, e.g., a virtual telephony device (e.g., a software application) that runs on the client device, or a physical telephony device (e.g., a programmable mobile/desk phone) that is communicatively coupled with the client device. The activation process can cause the softphone to register itself, and the user's telephone number, with the telephony service. Once the registration is complete, the softphone can establish a data connection (e.g., a Voice over IP (VoIP) connection) with the telephony service, thereby allowing the user to make and receive phone calls via the softphone using his/her telephone number.

With the SoDaaS solution above, many of the deficiencies associated with existing approaches for enabling portable telephone access can be minimized or eliminated. For example, unlike the "generic softphone client within desktop" approach, the SoDaaS solution does not tie the delivery of a user's telephone to the delivery of the user's desktop; instead, the telephone can be delivered to the user as a completely separate and independent resource. This can avoid unnecessary server-side resource usage in situations where the user only needs access to his/her telephone (without his/her desktop or associated applications).

As another example, since the SoDaaS manager centrally manages and automates the process of configuring end-user softphones, the DaaS service provider can directly control and monitor how users are mapped to telephone numbers and telephony service accounts. This means that the DaaS service provider can provision telephone numbers to users in a consistent manner and can keep track of aggregate and individual telephone usage metrics.

As yet another example, the SoDaaS solution above does not require multiple access points or user logins; rather, users can login once to the DaaS service and immediately gain access to their telephone, desktop, applications, and other resources, thereby simplifying the end-user workflow. In addition, since this single sign-on/login capability leverages the existing security infrastructure of the DaaS service, the security hardening features of the infrastructure can be automatically applied to the telephone access use case.

2. Exemplary DaaS Environment

To provide context for the embodiments described herein, FIG. 1 depicts an exemplary DaaS environment 100. As shown, DaaS environment 100 comprises a cloud-based server platform 102 that is configured to provide a DaaS service to a user 104 operating a client device 106. Cloud-based server platform 102 includes a physical host server 108 that hosts multiple virtual machines (VMs) 110(1)-110(N). Each VM 110(1)-110(N) executes a separate desktop operating system (OS) instance 112(1)-112(N). Cloud-based server platform 102 also includes a physical management server 114 that runs a DaaS manager 116 and a physical directory server 118 that runs a directory service 120. Although three servers are shown in this example, it should be appreciated that cloud-based server platform 102 may support any number of such servers, and that the functions attributed to components 110(1)-110(N), 112(1)-112(N), 116, and 120 may be logically divided among the servers in any manner.

Figure 2:
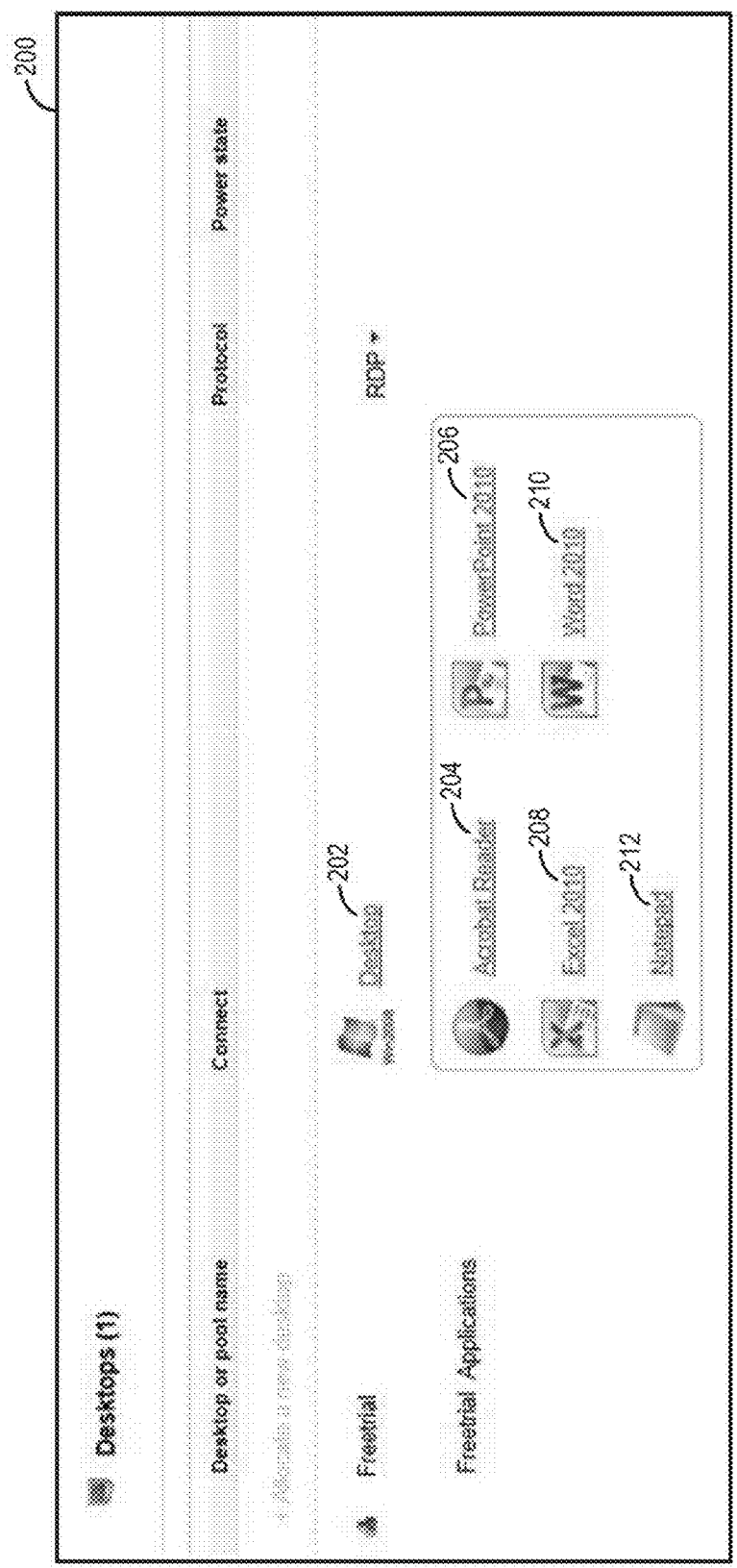
FIG. 2 depicts an exemplary end-user DaaS user interface (UI).

In a typical DaaS workflow, user 104 can first initiate, via a DaaS client 122 running on client device 106, a login request for logging into the DaaS service. DaaS client 122 can be, e.g., a software application that is proprietary to the DaaS service/implementation, or can be a standard web browser. Once initiated, the login request can be transmitted by DaaS client 122 and routed to DaaS manager 116, which can authenticate user 104 by verifying the user's login credentials via directory service 120. If the authentication/login is successful, DaaS manager 116 can return a "login success" message to DaaS client 122. DaaS client 122 can then present a UI to user 104 for accessing his/her desktop and application resources. FIG. 2 depicts an example of such a UI 200 that includes a desktop access link 202 and a number of application access links 204-212.

Upon being presented the UI, user 104 can activate an appropriate control for accessing his/her desktop (e.g., link 202 of FIG. 2). In response, DaaS client 122 can transmit a desktop access request to DaaS manager 116, which can broker a connection between DaaS client 122 and a VM 110(X) that is available to run the requested desktop. Finally, VM 110(X) can begin desktop execution and can communicate with DaaS client 122 over the brokered connection (via, e.g., a remote desktop protocol), thereby enabling user 104 to view and interact with his/her desktop on client device 106. Note that since the desktop is executed and managed centrally on cloud-based server platform 102, user 104's desktop access is not tied to client device 106. Rather, user 104 can potentially move to a different client device (at, e.g., a different physical location) and re-login to the DaaS service from the new device, in which case user 104 will continue to have access to the same desktop environment.

3. SoDaaS Environment

As discussed in the Background section, one limitation of DaaS implementations like the one depicted in FIG. 1 is that they are not designed to enable portable telephone access. It is possible to work around this limitation by installing a generic softphone client as a native application within each user's desktop. However, this "generic softphone within desktop" approach suffers from various shortcomings of its own (e.g., server-side inefficiencies due to tying the softphone client to the desktop, no accountability or tracking of telephone usage, multiple access points/logins, etc.).

Figure 3:
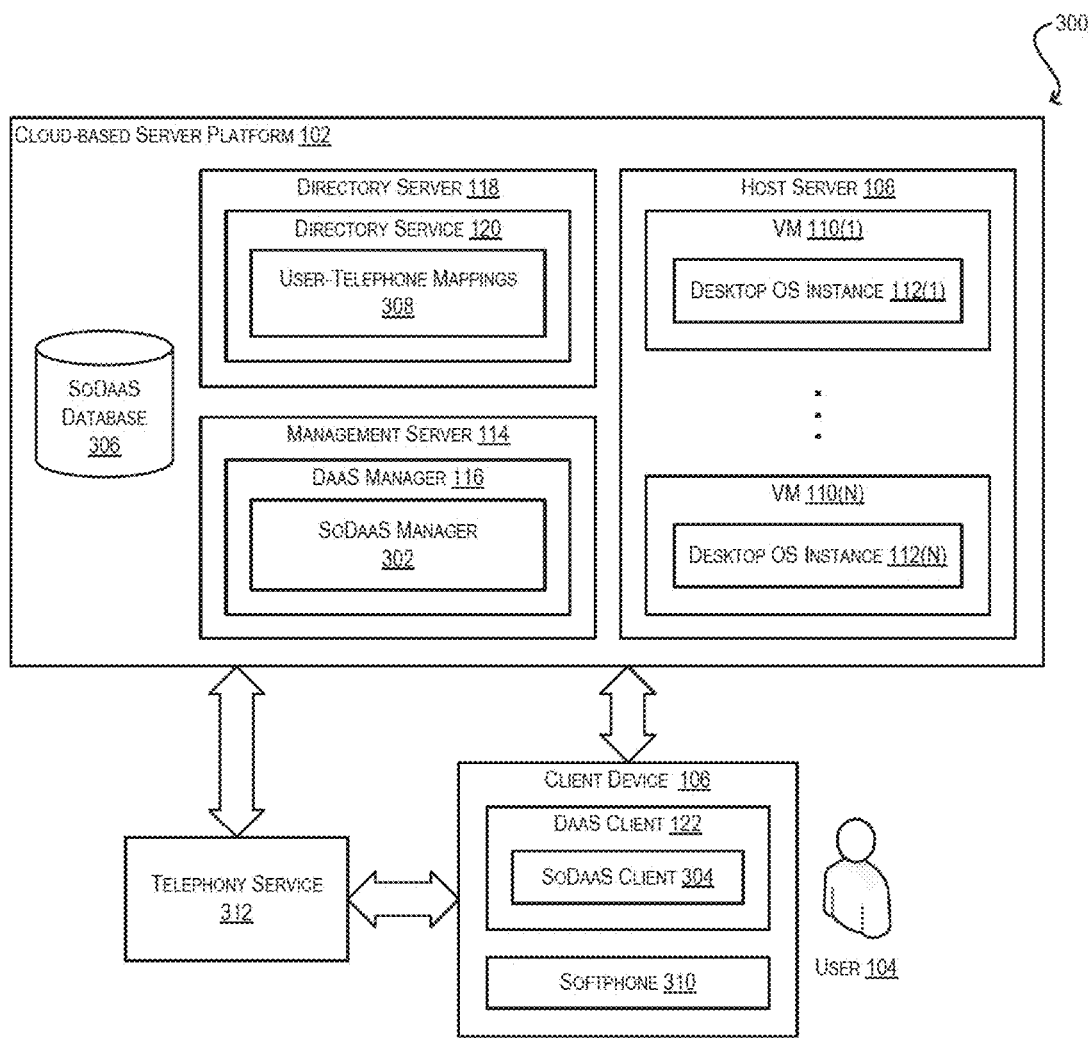
FIG. 3 depicts a DaaS environment that has been enhanced to support "Softphone-over-Daas" (SoDaaS) according to an embodiment.

To address the foregoing and other similar issues, FIG. 3 depicts an enhanced version of DaaS environment 100 (i.e., environment 300) that implements SoDaaS according to an embodiment. Environment 300 of FIG. 3 (referred to herein as a "SoDaaS environment") is similar to DaaS environment 100 of FIG. 1, but further includes a SoDaaS manager 302 (within DaaS manager 116), a SoDaaS client 304 (within DaaS client 122), and other components e.g., a SoDaaS database 306, user-telephone mappings 308, a softphone 310, and a telephony service 312). As described in the sections that follow, components 302-312 can interact with each other in a manner that facilitates the delivery of telephone access to user 104, without suffering from the drawbacks of prior art approaches.

It should be appreciated that FIG. 3 is illustrative and is not intended to limit the embodiments described herein. For example, although SoDaaS manager 302 is shown as being a part of DaaS manager 116, in other embodiments SoDaaS manager 302 can be implemented as a separate server-side component that is communicatively coupled with DaaS manager 116. Similarly, although SoDaaS client 304 is shown as being a part of DaaS client 122, in other embodiments SoDaaS client 304 can be implemented as a separate client-side component that is communicatively coupled with DaaS client 122. One of ordinary skill in the art will recognize other variations, modifications, and alternatives for the arrangement of SoDaaS environment 300.

4. SoDaaS Workflow

Figure 4:
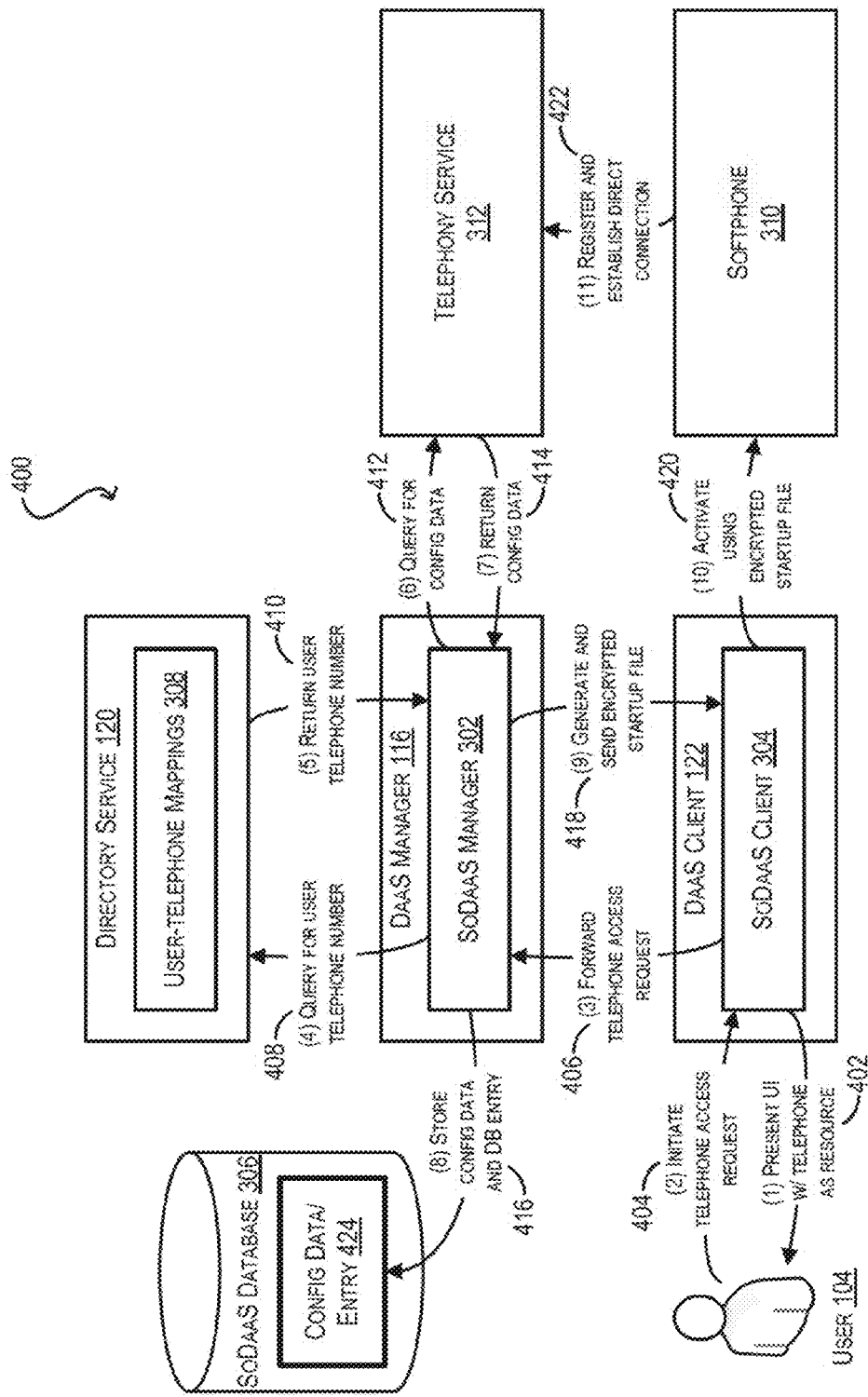
FIG. 4 depicts a workflow within the SoDaaS environment of FIG. 3 according to an embodiment.

FIG. 4 depicts a workflow 400 that can be performed by the components of SoDaaS environment 300 for delivering telephone access to user 104 of client device 106 according to an embodiment. Workflow 400 assumes that user 104 has logged into the DaaS service provided by cloud-based server platform 102, but has not yet requested access to his/her telephone.

Figure 5:
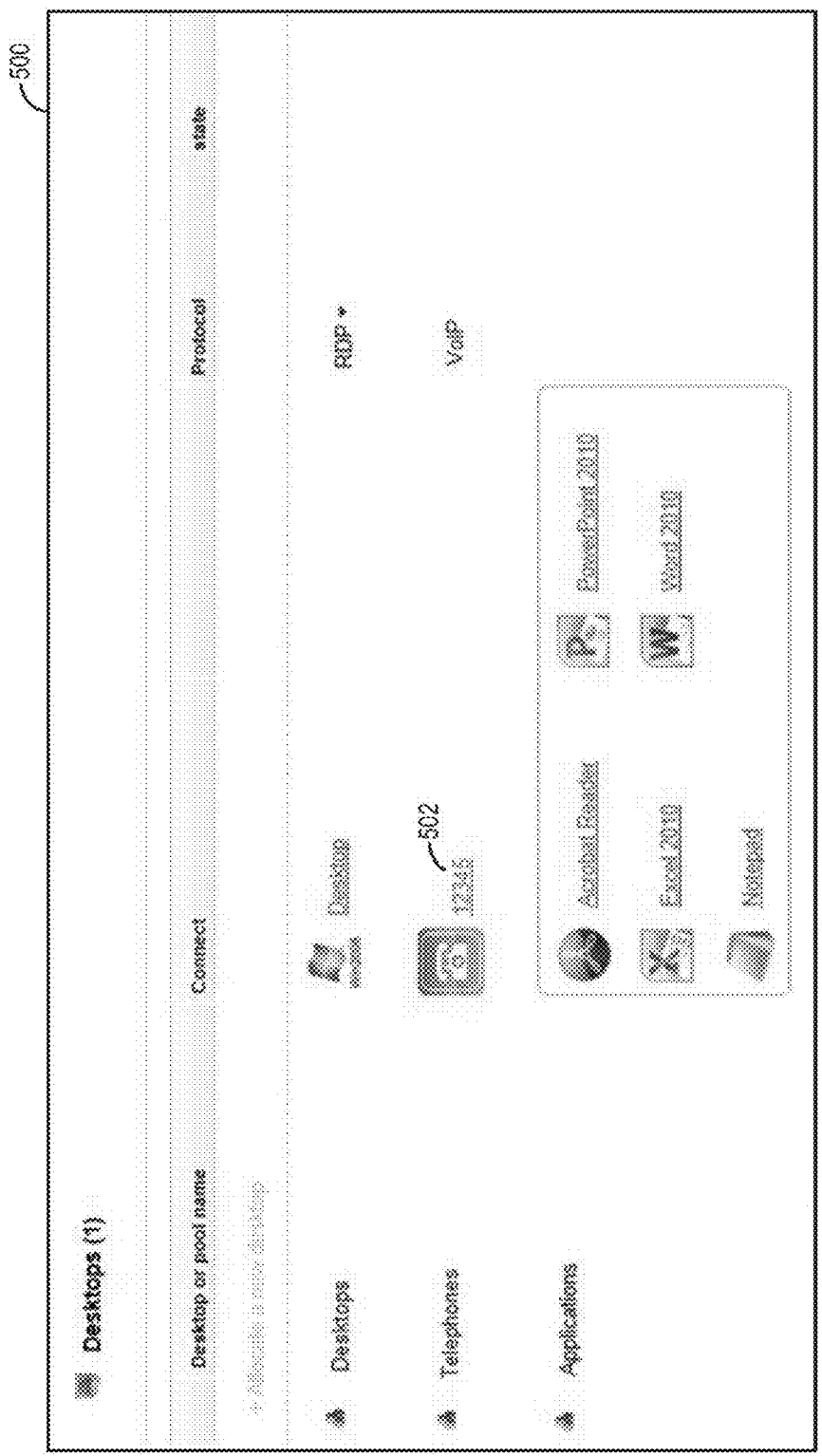
FIG. 5 depicts an end-user SoDaaS UI that presents a user's telephone as independent resource according to an embodiment.

At step (1) (reference numeral 402) of workflow 400, SoDaaS client 304 can generate (or cause DaaS client 122 to generate) a UI that presents user 104's telephone as an available resource. This UI can be similar to UI 200 of FIG. 2, but can include an access link for user 104's telephone that is separate from the access links for his/her desktop and applications. For instance, FIG. 5 depicts an example of such a UI 500 that includes a telephone access link 502.

At step (2) (reference numeral 404), user 104 can initiate a telephone access request by, e.g., activating link 502 of UI 500. In response, SoDaaS client 304 can forward the telephone access request to SoDaaS manager 302 (step (3), reference numeral 406).

At steps (4) and (5) (reference numerals 408 and 410), SoDaaS manager 302 can determine the telephone number that has been assigned to user 104. For example, SoDaaS manager 302 can send a telephone number query to directory service 120 that includes, e.g., user 104's username or ID (step (4), reference numeral 408). In response, directory service 120 can search user-telephone mappings 308, which can be pre-populated with mappings between the users of the DaaS service and their respective telephone numbers (e.g., their office numbers or extensions), and can return user 104's assigned telephone number (step (5), reference numeral 410).

Once user 104's telephone number has been determined, SoDaaS manager 302 can send a query (that includes the telephone number) to telephony service 312 for softphone configuration data (step (6), reference numeral 412). The softphone configuration data can comprise data usable by softphone 310 to register itself, as well as user 104's telephone number, with telephony service 312. For example, in certain embodiments, the softphone configuration data can include a target address (e.g., IP address) of the telephony service (or a server of the telephony service). In further embodiments, the softphone configuration data can include security credentials/metadata that enable softphone 310 to be allocated a telephony connection based on the user's telephone number (e.g., a username and password, or a PIN). In yet further embodiments, the softphone configuration data can include parameters used for creating and/or maintaining a telephony session (e.g., protocol, port, etc.). As used herein, the term "telephony service" refers to any service (e.g., cloud-based, on-premise, etc.) that can provide telecommunications functions to end-user telephony devices. For example, in one embodiment, telephony service 312 can provide telecommunications functions via VoIP protocol. Upon receiving and processing the query, telephony service 312 can return the appropriate softphone configuration data to SoDaaS manager 302 (step (7), reference numeral 414).

At step (8) (reference numeral 416), SoDaaS manager 302 can store a copy of the softphone configuration data in SoDaaS database 306 for future reference. SoDaaS manager 302 can also create an entry in SoDaaS database 306 that associates the location of the stored copy with user 104's identity and his/her telephone number. For example, Table 1 below depicts an example of such an entry:

TABLE 1

| User | Phone Number | Configuration Data |
|---|---|---|
| User 104 | 12345 | [DB_root]\User104-12345.cfg |

SoDaaS manager 302 can then generate an encrypted softphone startup file based on the softphone configuration data and can pass the encrypted softphone startup file to SoDaaS client 304 (step (9), reference numeral 418).

At step 10 (reference numeral 420), SoDaaS client 304 can receive the encrypted softphone startup file and can "activate" softphone 310 using the file. As noted previously, softphone 310 can be a telephony application running on client device 106, or a physical telephony device that is connected to client device 106 (via, e.g., USB, Wi-Fi. Bluetooth, etc.). In the former case, the activation process can comprise launching or re-launching the softphone application with the encrypted startup file. In the latter case, the activation process can comprise booting or re-booting the softphone device with the encrypted startup file.

Once the activation is complete, softphone 310 can register itself, and user 104's telephone number, with telephony service 312. In this way, telephony service 312 can be made aware that softphone 310 is ready and authorized to consume telecommunications functions with respect to the telephone number. Finally, softphone 310 can establish a direct data connection (e.g., a VoIP connection) with cloud telephony service 312, thereby enabling user 104 to send and receive telephone calls over softphone 310 using his/her telephone number (step (11), reference numeral 422).

Note that, in workflow 400, there is no need for SoDaaS manager 302/DaaS manager 116 to deliver user 104's desktop to SoDaaS client 304/DaaS client 122 as part of the telephone delivery process; the only information provided to SoDaaS client 304/DaaS client 122 is the softphone configuration data (in the form of the encrypted startup file) used to activate softphone 310. Thus, unlike the "generic softphone client within desktop" approach, user 104 can access his/her telephone as an individual and independent resource.

Further, note that the SoDaaS infrastructure manages and keeps track of the mappings between users and telephone numbers/telephony accounts (via user-telephone mappings 308 and SoDaaS database 306). As a result, the service provider can monitor telephone usage on a per-user or aggregate basis (for, e.g., billing purposes).

Yet further, note that user 104 does not need to manually login to telephony service 312 in order to use softphone 310 to make and receive telephone calls via his/her telephone number. Instead, user 104 can simply login to the DaaS service and request telephone access via the end-user DaaS UI (per step (2) of workflow 400). Components 302-312 then interoperate in the manner shown in FIG. 4 to automatically configure softphone 310 for use through telephony service 312, without any further input or intervention by user 104.

5. Server-Side and Client-Side Processing

Figure 6:
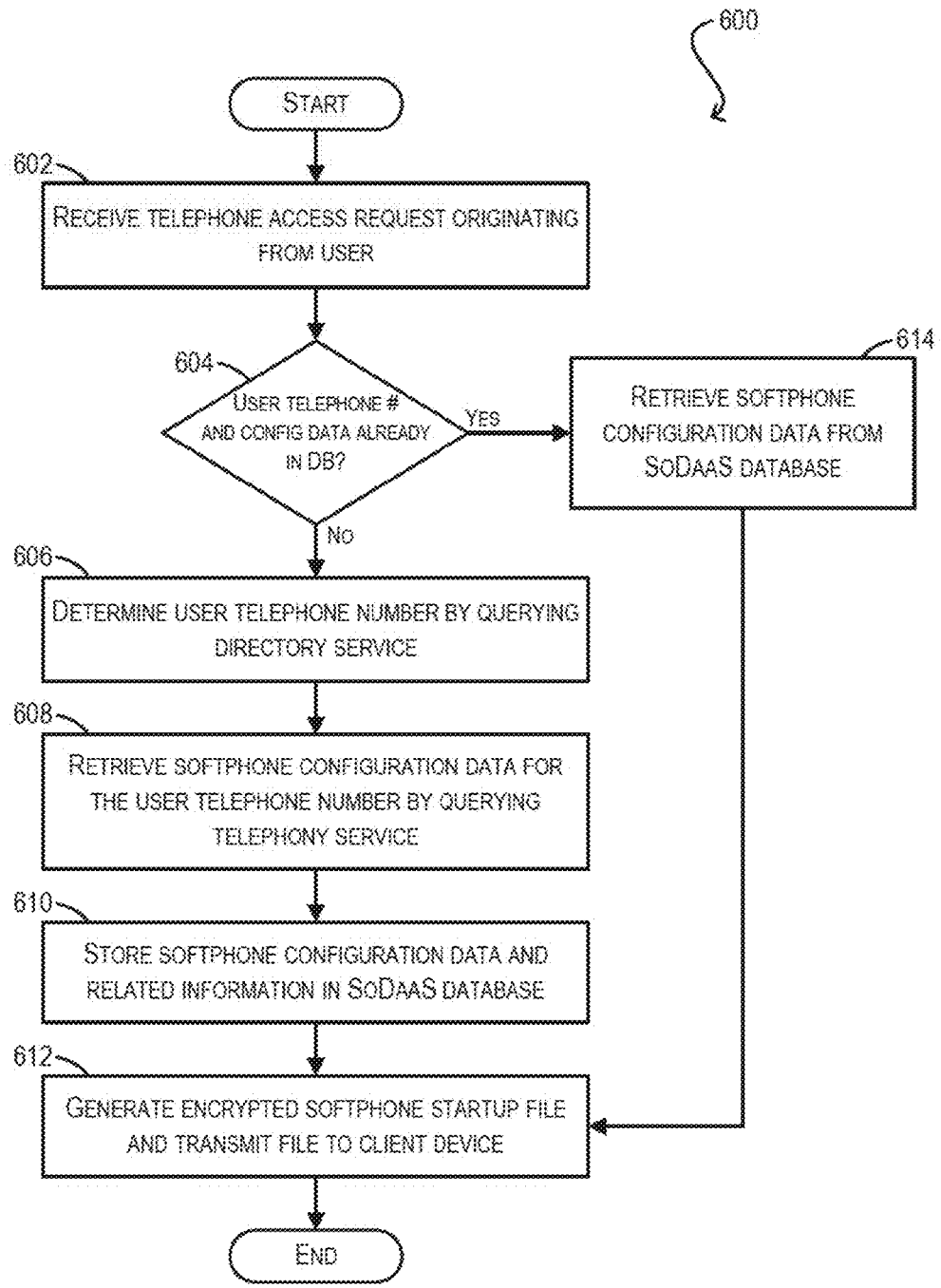
FIG. 6 depicts a flowchart detailing the server-side processing performed in the workflow of FIG. 4 according to an embodiment.

FIG. 6 depicts a flowchart 600 that details the server-side processing attributed to SoDaaS manager 302 in workflow 400 of FIG. 4 according to an embodiment. Flowchart 600 differs slightly from workflow 400 in that it includes logic enabling SoDaaS manager 302 to short-circuit the steps of querying directory service 120 and querying telephony service 312 in certain scenarios.

At block 602, SoDaaS manager 302 can receive a telephone access request originating from a user operating a client device (e.g., user 104 operating client device 106). For example, user 104 may have initiated the request by activating telephone access link 502 shown in UI 500 of FIG. 5.

At block 604, SoDaaS manager 302 can check SoDaaS database 306 to determine whether user 104's telephone number and softphone configuration data are already present in the database. This may occur if, e.g., user 104 previously requested his/her telephone, and thus caused SoDaaS manager 302 to retrieve and store this information per steps (4)-(8) of workflow 400. This may also occur if SoDaaS manager 302 has pre-cached the telephone numbers and configuration data for a group of users including user 104 (e.g., users in a particular group or organization that are likely to request telephone access).

If user 104's telephone number and softphone configuration data are not present in SoDaaS database 306, SoDaaS manager 302 can first determine the telephone number by querying directory service 120 (block 606). As noted with respect to FIG. 4, this telephone number can correspond to, e.g., the user's office number or extension, and can be maintained by the SoDaaS infrastructure in user-telephone mappings 308 of directory service 120.

SoDaaS manager 302 can then retrieve the softphone configuration data for user 104's telephone number by querying telephony service 312 (block 608). As noted with respect to FIG. 4, this softphone configuration data can correspond to data that is usable by softphone 310 for registering with telephony service 312 to send and receive telephone calls via the telephone number. Once SoDaaS manager 302 has retrieved the softphone configuration data, SoDaaS manager 302 can store a copy of the data and related information (e.g., user identity, user telephone number, file path to stored configuration data, etc.) in SoDaaS database 306 (block 610).

On the other hand, if SoDaaS manager 302 determines that user 104's telephone number and softphone configuration data are already in SoDaaS database 306 at block 604, SoDaaS manager 302 can directly retrieve the softphone configuration data from database 306 (block 614), without performing blocks 606-610.

Finally, at block 612, SoDaaS manager 302 can generate an encrypted softphone startup file based on the softphone configuration data and can transmit the file to client device 106.

Figure 7:
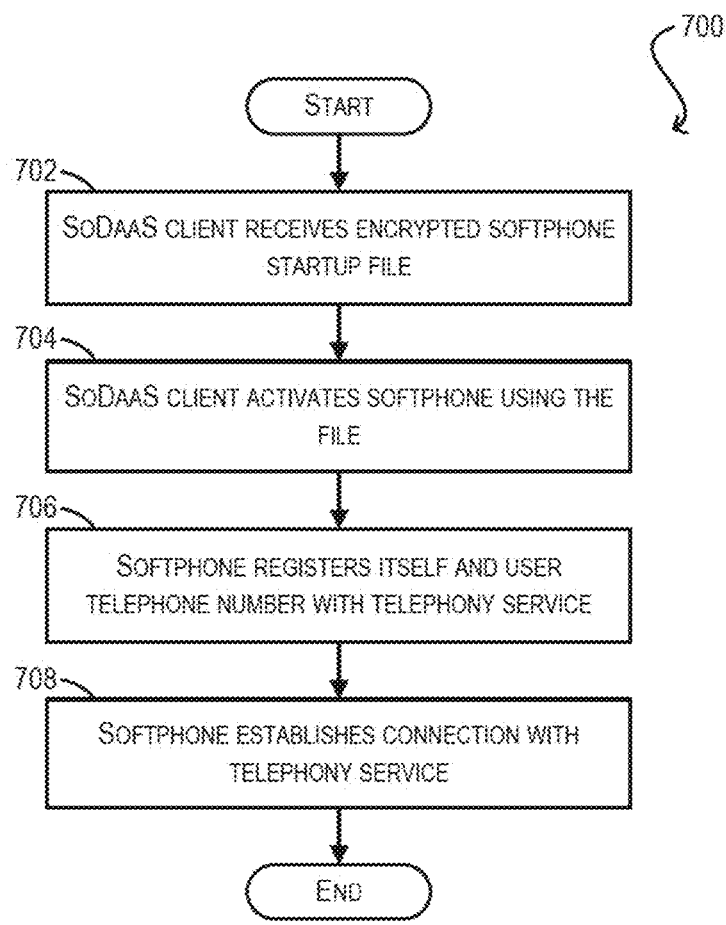
FIG. 7 depicts a flowchart detailing the client-side processing performed in the workflow of FIG. 4 according to an embodiment.

FIG. 7 depicts a flowchart 700 that details the client-side processing attributed to SoDaaS client 304 and softphone 310 in workflow 400 of FIG. 4 according to an embodiment. Flowchart 700 can be performed by SoDaaS client 304/softphone 310 in response to the server-side processing of flowchart 600 of FIG. 6.

At block 702, SoDaaS client 304 can receive the encrypted softphone startup file sent by SoDaaS manager 302 at block 612 of flowchart 600. SoDaaS client 304 can then activate softphone 310 using the received file (block 704). As noted with respect to workflow 400 of FIG. 4, this activation process can comprise launching/re-launching or booting/re-booting the softphone with the configuration specified in the file.

At block 706, the activation can cause softphone 310 to register itself and user 104's telephone number with telephony service 312. Once the registration is complete, softphone 310 can establish a direct data connection with telephony service 312 (block 708), thereby allowing user 104 to use softphone 310 to send and receive telephone calls at his/her telephone number.

6. Telephony Connection Management

It should be appreciated that the foregoing figures and description present a simplified view of the telephone delivery workflow within SoDaaS environment 300, and that various modifications and enhancements are possible. For example, FIGS. 8 and 9 depict modified versions of flowcharts 600 and 700 respectively that enable the SoDaaS infrastructure to manage the data connections between end-users' softphones and telephony service 312 as part of the telephony delivery process.

Figure 8:
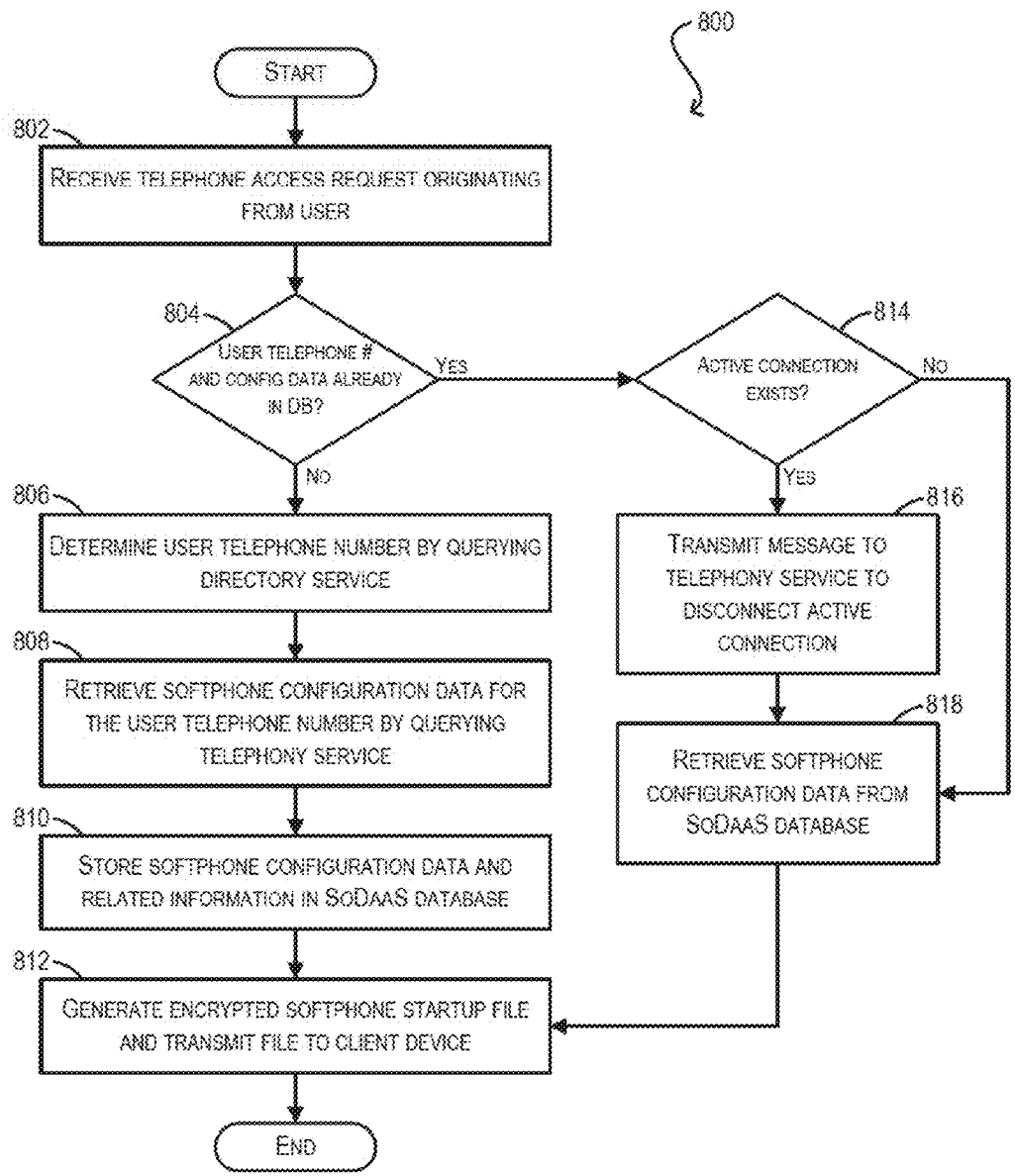
FIG. 8 depicts a version of the flowchart of FIG. 6 that has been modified to support telephony connection management according to an embodiment.
Figure 9:
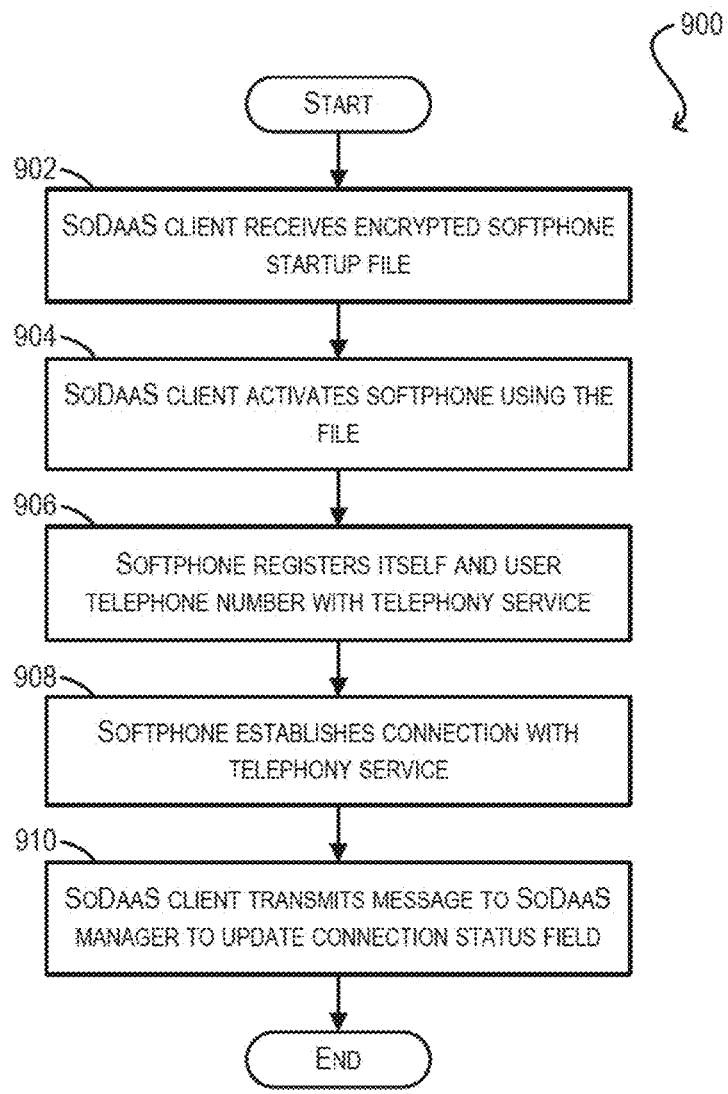
FIG. 9 depicts a version of the flowchart of FIG. 7 that has been modified to support telephony connection management according to an embodiment.

Starting with server-side flowchart 800 of FIG. 8, blocks 802-812 are substantially similar to blocks 602-612 of flowchart 600. However, if SoDaaS manager 302 determines at block 804 that user 104's telephone number and softphone configuration data are already in SoDaaS database 306, SoDaaS manager 302 can check whether any existing softphone currently has an active data connection with telephony service 312 using user 104's telephone number (block 814). In one embodiment, SoDaaS manager 302 can perform this check by examining an extra "connection status" field that is maintained in SoDaaS database 306. For example, Table 2 below depicts a modified version of Table 1 that includes this "connection status" field with the status "Active" for the DB entry of user 104.

TABLE 2

| User | Phone Number | Configuration Data | Connection Status |
|---|---|---|---|
| User 104 | 12345 | [DB_root]\User104-12345.cfg | Active |

If SoDaaS manager 302 determines that an active connection exists for user 104's telephone number, SoDaaS manager 302 can transmit a message to telephony service 312 to disconnect the active connection (block 816). In this way, SoDaaS manager 302 can allow user 104 to establish a new data connection from his/her current client device/softphone. SoDaaS manager 302 can then retrieve the softphone configuration data from SoDaaS database 302 per its normal operation (block 818).

On the other hand, if SoDaaS manager 302 determines that there is no active connection, SoDaaS manager 302 can proceed directly to block 818.

Turning now to client-side flowchart 900 of FIG. 9, blocks 902-908 are substantially similar to blocks 702-708 of flowchart 700. However, at block 910, SoDaaS client 304 can transmit a message to SoDaaS manager 302 with instructions to update the "connection status" field in SoDaaS database 306 for user 104 to "Active." Thus, SoDaaS manager 302 can be made aware that an active data connection has now been established for this telephone number (which may need to be disconnected in the future per flowchart 800 if user 104 subsequently submits a new telephone access request from a new client device). Further, although not shown in FIG. 9, when user 104 manually disconnects the data connection between softphone 310 and telephony service 312, SoDaaS client 304 can send another message to SoDaaS manager 302 with instructions to update the "connection status" field in SoDaaS database 306 for user 104 to "Inactive." Thus, SoDaaS manager 302 can be made aware that the previously active data connection is no longer active.

7. Corporate SoDaaS Implementation

Figure 10:
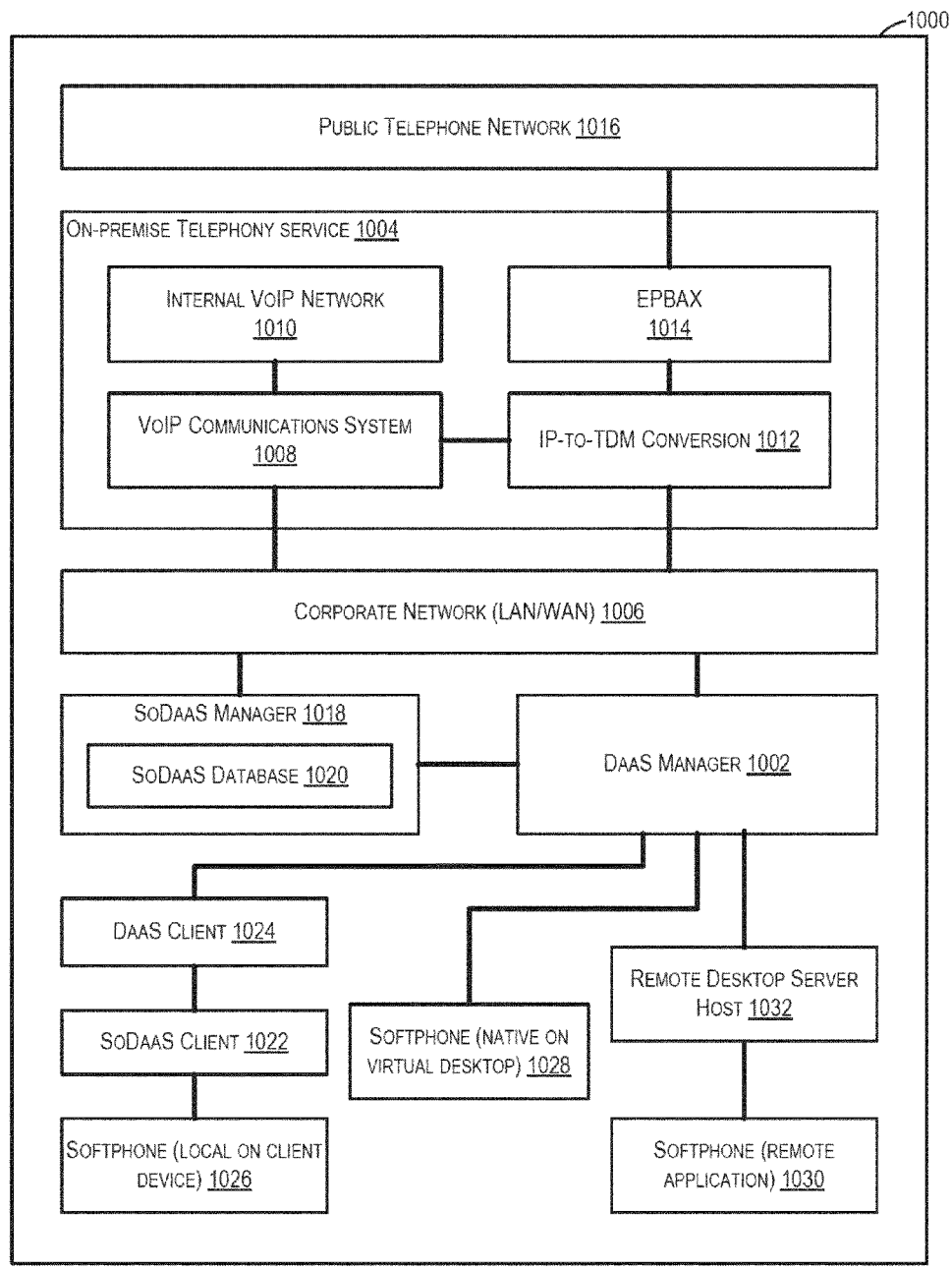
FIG. 10 depicts a corporate SoDaaS implementation according to an embodiment.

To provide a more tangible example of the embodiments described herein, FIG. 10 depicts an implementation of the SoDaaS framework in the context of a corporate DaaS/telephony environment 1000. As shown, environment 1000 of FIG. 10 includes a DaaS manager 1002 (which may be, e.g., a VMWare View connection server) that is communicatively coupled with an on-premise telephony service 1004 via a corporate network 1006. On-premise telephony service 1004 includes a VoIP communications system 1008, an internal VoIP network 1010, an IP-to-TDM (time-division multiplexing) conversion module 1012, and an EPBAX (electronic private branch automatic exchange) 1014 (which is connected to a public telephone network 1016).

In addition, environment 1000 includes a SoDaaS manager 1018 (comprising a SoDaaS database 1020) that is communicatively coupled with DaaS manager 1002 and on-premise telephony service 1004 (through corporate network 1006), and a SoDaaS client 1022 that is communicatively coupled with a DaaS client 1024. Together, SoDaaS manager 1018 and SoDaaS client 1022 can interoperate according to the techniques described in the preceding sections to facilitate telephone delivery to a user via a softphone 1026 running locally on (or attached to) the user's client device.

It should be noted that environment 1000 also includes two types of softphones other than local client-side softphone 1026—a softphone 1028 that is delivered to end-users as a native application within a portable (i.e., virtual) desktop, and a softphone 1030 that is delivered to end-users as a remote application via a Remote Desktop Server Host (RDSH) 1032. Softphones 1028 and 1030 do not provide all of the advantages of local softphone 1026 (for example, softphone 1028 is tied to the user's desktop, and thus cannot be delivered as an independent resource). However, softphones 1028 and 1030 can still be configured in an automatic fashion by the server-side SoDaaS components of environment 1000. In these embodiments, in order to activate and register softphone 1028 or 1030 with an appropriate telephony service (such as on-premise service 1004), some of the functionality attributed to SoDaaS client 1022 may be subsumed by SoDaaS manager 1018 (or another server-side component).

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for delivering telephone access, the method comprising:
   receiving a user logon at a server system, the server system configured to selectively provide user access to one or more of a plurality of services in response to the user logon including a remote desktop and telephone access;
   receiving, at the server system, a telephone access request originating from a user operating a client device;
   determining, by the server system, a telephone number assigned to the user operating the client device associated with the user logon;
   retrieving, by the server system based on the telephone number, softphone configuration data from a telephony service, wherein a softphone is a virtual or physical end user telephony device, and wherein the softphone configuration data, in response to activation of a softphone associated with the client device by a user operating the client device, enables the softphone to register itself, and the telephone number, with the telephony service, wherein registering with the telephony service indicates to the telephony service that the smartphone is ready and authorized to consume telecommunications functions with respect to the telephone number including providing a data connection between the softphone and the telephony service to send and receive calls using the telephone number; and
   transmitting, by the server system, the softphone configuration data to the client device,
   wherein the server system is part of a cloud-based server platform configured to deliver the remote desktop for a cloud-based virtual machine to the user, and wherein the softphone configuration data is transmitted to the client device without transmitting the remote desktop together with the softphone configuration data to the user such that the client device provides telephone access independent of the remote desktop.

2. The method of claim 1 wherein determining the telephone number assigned to the user comprises:
   transmitting a query to a directory service configured to maintain predefined mappings between a plurality of users and a plurality of telephone numbers, the query including information identifying the user; and receiving the telephone number in response to the query.

3. The method of claim 1 wherein transmitting the softphone configuration data to the client device comprises: generating, based on the softphone configuration data, an encrypted softphone startup file; and transmitting the encrypted softphone startup file to the client device.

4. The method of claim 1 wherein the client device is configured to activate the softphone using the softphone configuration data, wherein the activating causes the softphone to register itself, and the phone number, with the telephony service, and wherein the registering allows the softphone to establish a data connection with the telephony service for sending and receiving telephone calls using the telephone number.

5. The method of claim 1 further comprising:
   storing, in a database accessible to the server system, a copy of the softphone configuration data and a database entry identifying the user, the telephone number, and a file path of the stored copy; receiving a telephone access request from the user via another client device; retrieving, based on the database entry, the copy of the softphone configuration data from the database; and transmitting the copy of the softphone configuration data to said another client device.

6. The method of claim 1 further comprising:
   determining that another softphone has an active data connection with the telephony service for sending and receiving telephone calls using the telephone number; and transmitting a request to the telephony service to terminate the active data connection.

7. The method of claim 1, wherein the softphone is provided as a remote application for the client device.

8. The method of claim 1, wherein the configuration data includes security credentials that enable the softphone to be allocated a telephony connection.

9. The method of claim 1, wherein the configuration data includes parameters used to create a telephony session.

10. A non-transitory computer readable storage medium having stored thereon computer software executable by a server system, the computer software embodying a method for delivering telephone access to a user operating a client device, the method comprising:
    receiving a user logon at a server system, the server system configured to selectively provide user access to one or more of a plurality of services in response to the user logon including a remote desktop and telephone access;

receiving, at the server system, a telephone access request originating from the user operating the client device associated with the user logon;

determining a telephone number assigned to the user operating the client device;

retrieving, based on the telephone number, softphone configuration data from a telephony service, wherein a softphone is a virtual or physical end user telephony device, and wherein the softphone configuration data, in response to activation of a softphone associated with the client device by a user operating the client device, enables the softphone to register itself, and the telephone number, with the telephony service, wherein registering with the telephony service indicates to the telephony service that the smartphone is ready and authorized to consume telecommunications functions with respect to the telephone number including providing a data connection between the softphone and the telephony service to send and receive calls using the telephone number; and transmitting the softphone configuration data to the client device, wherein the server system is part of a cloud-based server platform configured to deliver the remote desktop for a cloud-based virtual machine to the user, and wherein the softphone configuration data is transmitted to the client device without transmitting the remote desktop together with the softphone configuration data to the user such that the client device provides telephone access independent of the remote desktop.

11. The non-transitory computer readable storage medium of claim 10 wherein determining the telephone number assigned to the user comprises: transmitting a query to a directory service configured to maintain predefined mappings between a plurality of users and a plurality of telephone numbers, the query including information identifying the user; and receiving the telephone number in response to the query.

12. The non-transitory computer readable storage medium of claim 10 wherein transmitting the softphone configuration data to the client device comprises: generating, based on the softphone configuration data, an encrypted softphone startup file; and transmitting the encrypted softphone startup file to the client device.

13. The non-transitory computer readable storage medium of claim 10 wherein the client device is configured to activate the softphone using the softphone configuration data, wherein the activating causes the softphone to register itself, and the phone number, with the telephony service, and wherein the registering allows the softphone to establish a data connection with the telephony service for sending and receiving telephone calls using the telephone number.

14. The non-transitory computer readable storage medium of claim 10 wherein the method further comprises: storing, in a database accessible to the server system, a copy of the softphone configuration data and a database entry identifying the user, the telephone number, and a file path of the stored copy; receiving a telephone access request from the user via another client device; retrieving, based on the database entry, the copy of the softphone configuration data from the database; and transmitting the copy of the softphone configuration data to said another client device.

15. The non-transitory computer readable storage medium of claim 10 wherein the method further comprises:

determining that another softphone has an active data connection with the telephony service for sending and receiving telephone calls using the telephone number; and transmitting a request to the telephony service to terminate the active data connection.

16. A server system comprising:

a processor; and a non-transitory computer readable medium having stored thereon instructions that, when executed by the processor, causes the processor to:

receive a user logon at the server system, the server system configured to selectively provide user access to one or more of a plurality of services in response to the user logon including a remote desktop and telephone access;

receive a telephone access request originating from a user operating a client device;

determine a telephone number assigned to the user operating the client device associated with the user logon;

retrieve, based on the telephone number, softphone configuration data from a telephony service, wherein a softphone is a virtual or physical end user telephony device, and wherein the softphone configuration data, in response to activation of a softphone associated with the client device by a user operating the client device, enables the softphone to register itself, and the telephone number, with the telephony service, wherein registering with the telephony service indicates to the telephony service that the smartphone is ready and authorized to consume telecommunications functions with respect to the telephone number including providing a data connection between the softphone and the telephony service to send and receive calls using the telephone number; and transmit the softphone configuration data to the client device, wherein the server system is part of a cloud-based server platform configured to deliver the remote desktop for a cloud-based virtual machine to the user, and wherein the softphone configuration data is transmitted to the client device without transmitting the remote desktop together with the softphone configuration data to the user such that the client device provides telephone access independent of the remote desktop.

17. The server system of claim 16 wherein the instructions that cause the processor to determine the telephone number assigned to the user comprises instructions that cause the processor to:

transmit a query to a directory service configured to maintain predefined mappings between a plurality of users and a plurality of telephone numbers, the query including information identifying the user; and receive the telephone number in response to the query.

18. The server system of claim 16 wherein the instructions that cause the processor to transmit the softphone configuration data to the client device comprises instructions that cause the processor to: generate, based on the softphone configuration data, an encrypted softphone startup file; and transmit the encrypted softphone startup file to the client device.

19. The server system of claim 16 wherein the client device is configured to activate the softphone using the softphone configuration data, wherein the activating causes the softphone to register itself, and the phone number, with the telephony service, and wherein the registering allows the softphone to establish a data connection with the telephony service for sending and receiving telephone calls using the telephone number.

20. The server system of claim 16 wherein the instructions further cause the processor to: store, in a database accessible to the server system, a copy of the softphone configuration data and a database entry identifying the user, the telephone number, and a file path of the stored copy; receive a telephone access request from the user via another client device; retrieve, based on the database entry, the copy of the softphone configuration data from the database; and transmit the copy of the softphone configuration data to said another client device.

21. The server system of claim 16 wherein the instructions further cause the processor to:
- determine that another softphone has an active data connection with the telephony service for sending and receiving telephone calls using the telephone number; and
- transmit a request to the telephony service to terminate the active data connection.

\* \* \* \* \*